United States Patent
Ruffa

(10) Patent No.: US 9,674,616 B1
(45) Date of Patent: Jun. 6, 2017

(54) DYNAMIC ACOUSTIC IMPEDANCE MATCHING DEVICE AND METHOD

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1015 days.

(21) Appl. No.: 13/560,398

(22) Filed: Jul. 27, 2012

(51) Int. Cl.
 *H04R 25/00* (2006.01)
 *H04R 11/00* (2006.01)
 *H04R 23/00* (2006.01)

(52) U.S. Cl.
 CPC ........... *H04R 11/00* (2013.01); *H04R 23/004* (2013.01)

(58) Field of Classification Search
 CPC ........ H04R 11/00; H04R 17/00; H04R 9/045; H04R 1/42; H04R 23/00; H04R 23/004; H04R 21/028; G08B 3/06

USPC ......... 381/163, 165, 166; 398/132, 133, 134
 See application file for complete search history.

(56) References Cited

U.S. PATENT DOCUMENTS

| | | | |
|---|---|---|---|
| 6,295,365 B1 * | 9/2001 | Ota | H04R 17/00 381/114 |
| 2002/0027999 A1 * | 3/2002 | Azima et al. | 381/431 |
| 2006/0182300 A1 * | 8/2006 | Schwartz | 381/355 |
| 2011/0121683 A1 * | 5/2011 | Milyutin et al. | 310/313 B |
| 2012/0270147 A1 * | 10/2012 | Katoh et al. | 430/109.1 |
| 2014/0174277 A1 * | 6/2014 | Mann | 84/331 |

* cited by examiner

*Primary Examiner* — Duc Nguyen
*Assistant Examiner* — Sean H Nguyen
(74) *Attorney, Agent, or Firm* — James M. Kasischke; Jean-Paul A. Nasser; Michael P. Stanley

(57) ABSTRACT

A dynamic acoustic impedance matching device for an acoustic signal transmitted or received in a medium by a transducer includes a particle flow in an acoustic signal path of the transducer. The particle flow has an acoustic impedance between an acoustic impedance of the transducer and an acoustic impedance of the medium.

4 Claims, 4 Drawing Sheets

DYNAMIC ACOUSTIC IMPEDANCE MATCHING DEVICE AND METHOD

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to acoustic transducers, and more particularly, to an intermediary impedance for an acoustic transducer and an acoustic signal medium.

(2) Description of the Prior Art

Acoustic transducers may be used to transmit or receive an acoustic signal in a medium. The specific acoustic impedance of a medium is the ratio of the acoustic pressure to the acoustic particle velocity of sound propagating through the medium. Typically, transducers, such as piezoelectric transducers incorporating PZT (lead zirconate titanate), have a specific acoustic impedance much larger than the specific acoustic impedance of the medium through which an acoustic signal is transmitted or received by the transducer. This impedance mismatch may result in a significant amount of reflected energy, and resultant signal loss, at the boundary between the transducer and medium.

A layer of material that serves as an acoustic impedance matching layer may be inserted at the boundary between the transducer and the surrounding acoustic medium in order to improve signal propagation from the transducer to the medium or vice versa. Specifically, an acoustic impedance matching layer having an impedance intermediate of the transducer and the medium may be inserted at the boundary to reduce the amount of reflected acoustic energy. Prior art matching layers include screens, perforated plates, and various layers of polymers with inclusions (see e.g., U.S. Pat. No. 3,674,945 to Hands).

These solutions typically provide one or more so-called static layers (i.e., layers that do not move). Problems have been identified with these solutions. For example, static layers may support shear waves which travel transversely to the direction of acoustic signal propagation and have been associated with compromising desired aspects of the acoustic signal. Further, static layers are often times incapable of being removed, supplemented, or otherwise adjusted to provide a user with the capacity to implement a desired level of impedance matching. Also, the limits of known materials for static layers may prevent users from implementing a desired matching impedance.

What is needed then is a solution for impedance mismatch between a transducer and a surrounding acoustic medium which provides a user with the capacity to implement a desired impedance match, to allow a user to adjust such impedance, and to prevent the introduction of potentially compromising shear waves.

SUMMARY OF THE INVENTION

In accordance with one exemplary embodiment of the present invention, a dynamic acoustic impedance matching device (i.e., having one or more impedance layers that move) for an acoustic signal transmitted or received in a medium by a transducer includes a particle flow in an acoustic signal path of the transducer. The particle flow has an intermediate acoustic impedance between an acoustic impedance of the transducer and an acoustic impedance of the surrounding medium.

In accordance with another exemplary embodiment of the present invention, a transducer for transmitting or receiving an acoustic signal in a surrounding acoustic medium includes an acoustic transducer element and a dynamic acoustic impedance matching device adjacent to the transducer element. The device is operable to provide an acoustic impedance between an acoustic impedance of the transducer element and an acoustic impedance of the medium.

In accordance with another exemplary embodiment of the present invention, a method of providing an intermediary impedance between a transducer and a medium can include the steps of operating the transducer to transmit or receive an acoustic signal and moving particles in an acoustic signal path of the transducer, the particles providing an acoustic impedance between an acoustic impedance of the transducer and an acoustic impedance of the medium.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE INVENTION

Figure 2:
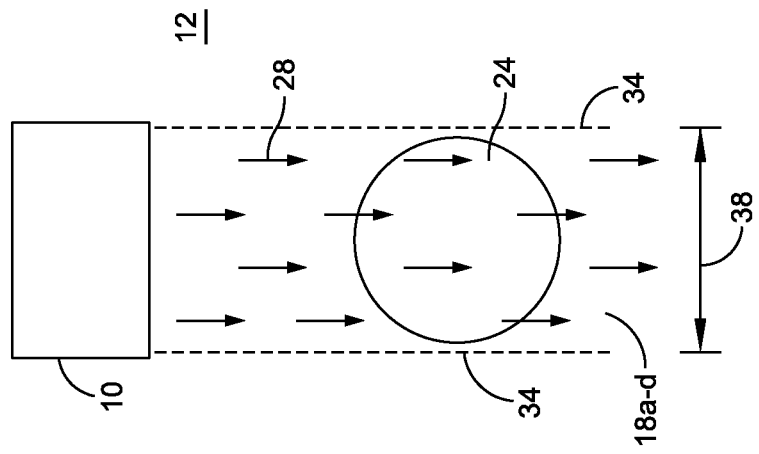
FIG. 2 is a front view of the dynamic acoustic impedance matching device, particle flow, and transducer shown in FIG. 1.
Figure 1:
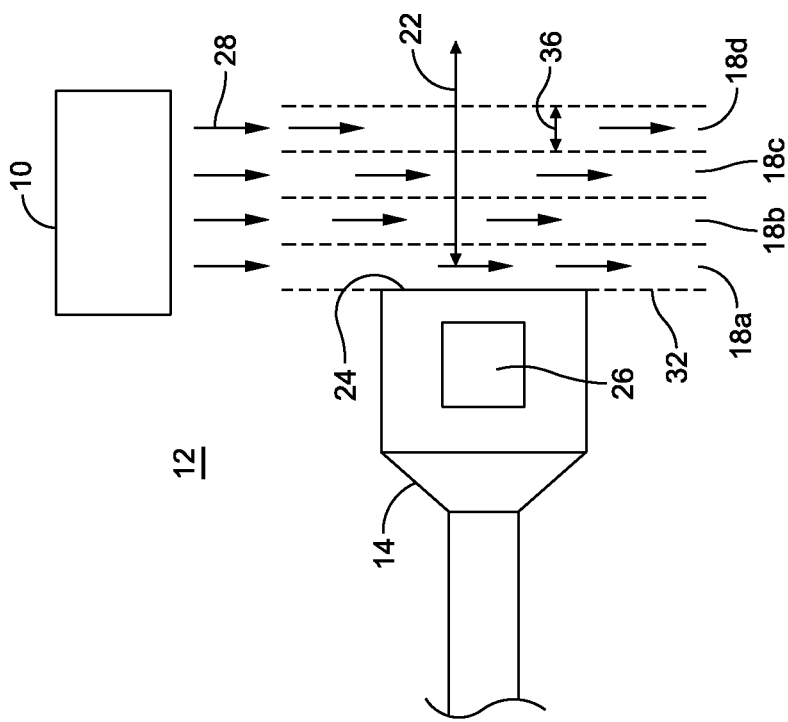
FIG. 1 is a side view of a dynamic acoustic impedance matching device providing a particle flow in a signal path of a transducer according to an exemplary embodiment.

Referring now to the drawings, and more particularly to FIG. 1 and FIG. 2, a dynamic acoustic impedance matching device 10 is shown above and in front of a transducer 14, which may include, for example, a piezoelectric transducer element 26. Transducer 14 may transmit and/or receive acoustic signals that pass through a medium 12. Medium 12 may be, for example, air or water, although medium 12 may also be other compositions of matter.

During operation, the dynamic acoustic impedance matching device 10 may provide a plurality of particle flows 18a to 18d in medium 12. Particle flows 18a to 18d may be in a signal path 22 of transducer 14. In the embodiment of FIG. 1 and FIG. 2, four such particle flows 18a to 18d are shown, however, and as will be discussed further below, the dynamic acoustic impedance matching device 10 may include as few as a single particle flow or more than four particle flows.

As shown in FIG. 1 and FIG. 2, each particle flow 18a to 18d may emanate from device 10 to form a continuous or intermittent stream of particles (represented by arrows 28) in medium 12 travelling transversely to a signal path 22 of transducer 14. Particle flows 18a to 18d may include any particles, such as sand ($SiO_2$) particles, for impeding an acoustic signal transmitted or received by transducer 14. For example, each particle flow layer 18a to 18d may be configured to provide an acoustic impedance between an acoustic impedance of the transducer 14 and an acoustic impedance of the medium 12.

The density of successive particle flows 18a to 18d may be incrementally reduced or increased with distance relative to the front surface 24 of transducer 14 to provide a gradual or more continuous transition in impedance between transducer 14 and medium 12.

As shown in FIG. 1 and FIG. 2, the dynamic acoustic impedance matching device 10 may be configured to provide each particle flow 18a to 18d in a substantially planar formation (see arrows 28 in FIG. 1) adjacent front surface 24 of transducer 14. Specifically, each particle flow may have a thickness 36 (FIG. 1) and a width 38 (FIG. 2). In FIG. 2, particle flow 18d is visible and particle flows 18a-18c are located behind particle flow 18d.

One skilled in the art will appreciate that the dynamic acoustic impedance matching device 10 may incorporate any manual or automatic system to provide each particle flow 18a to 18d in medium 12 and across signal path 22. For example, device 10 may include a manually filled hopper having orifices in the form of slots in a bottom surface thereof. Such orifices may be configured to provide each particle flow 18a to 18d at a specific density relative to the density of the ambient medium 12. For example, during operation of the dynamic acoustic impedance matching device 10, layer 18a may comprise 80% particles and 20% ambient medium 12, by volume; layer 18b may comprise 60% particles and 40% ambient medium 12, by volume; layer 18c may comprise 40% particles and 60% ambient medium 12, by volume; and layer 18d may comprise 20% particles and 80% ambient medium 12, by volume.

As further shown in FIG. 1 and FIG. 2, each particle flow 18a to 18d may be exposed to the medium 12 and to adjacent particle flows. Specifically, and as indicated by the dashed lines 32 in FIG. 1, particle flows 18a to 18d may be configured without any separating physical boundaries therebetween. Also, particle flows 18a to 18d may be configured without any physical boundary at the transverse edges thereof, as indicated by the vertical dashed lines 34 in FIG. 2.

The absence of physical boundaries between layers 18a to 18d or at the edges thereof allows layers 18a to 18d to provide an impedance function without the signal reflection associated with a static layer or set of static layers. Further, unlike static impedance layers which may support shear waves, particle flows 18a to 18d may behave similarly to a fluid or a plurality of fluids and thus, be incapable of supporting potentially undesirable shear waves.

The dynamic acoustic impedance matching device 10 may be configured to provide selective operation of any combination of particle flows 18a to 18d. For example, particle flows 18a and 18d may provide an acoustic impedance different from an acoustic impedance provided by simultaneous particle flows 18a, 18b, 18c, and 18d. Other combinations of individual particle flows 18a to 18d may be provided in signal path 22 to provide any desired impedance to the signal path 22.

Figure 4:
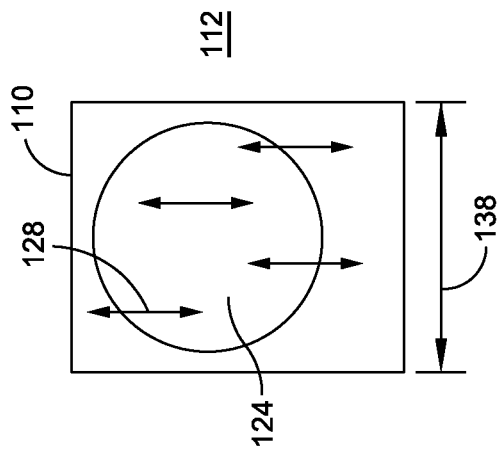
FIG. 4 is a front view of the dynamic acoustic impedance matching device, particle flow, and transducer shown in FIG. 2.
Figure 3:
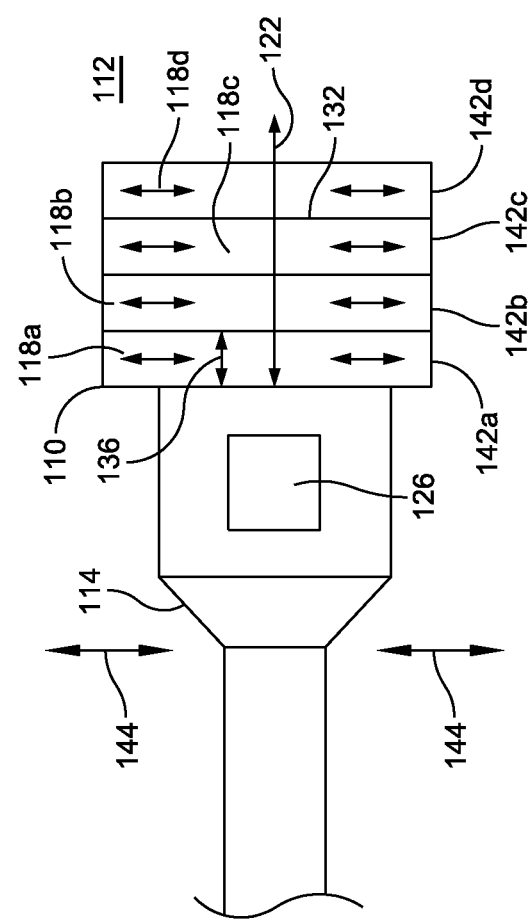
FIG. 3 is a side view of a dynamic acoustic impedance matching device providing a particle flow in a signal path of a transducer (i.e., the propagation path of sound emanating from the transducer, or received by the transducer) according to another exemplary embodiment.
Figure 6:
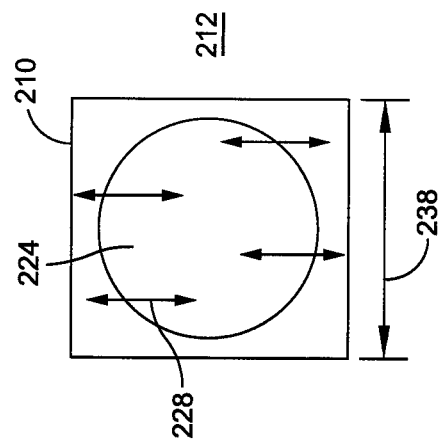
FIG. 6 is a front view of the dynamic acoustic impedance matching device, particle flow, and transducer shown in FIG. 5

FIG. 3 and FIG. 4 show another exemplary embodiment. The dynamic acoustic impedance matching device 110 includes a plurality of compartments 142a to 142d each of which may contain a sealed volume for particle flows 118a to 118d, respectively. Particle flows 118a-188d may comprise, for example, the types of particles used in particle flows 18a-18d, and a medium, such as ambient medium 12. Because particle flows 118a-118d are in a sealed volume, the medium of particle flows 118a-118d may be different than ambient medium 12. Each compartment may have a thickness 136 and a width 138, which as shown in FIG. 3 and FIG. 4, are constant, however, either the thickness 136 or width 138 of each particle flow 118a-118d may vary. The arrows 128 in general indicate particle flow movement within each compartment 142a-142d. The movement of particles may follow any path within the compartments, i.e., the particle movement is not restricted to the directions indicated by arrows 128.

Each particle flow 118a to 118d may have a density which varies between compartments. For example, each successive compartment may have a lower particle flow density than the preceding compartment.

Particle flows 118a to 118d may be selectively operated by agitation. For example, if device 110 is rigidly attached to transducer 114, then manual shaking of transducer 114 in the direction indicated by arrows 144 may cause particles within compartments 142a to 142d to flow into a signal path 122 of transducer 114. The resulting signal impedance may improve the efficiency of transducer 114 in the transmission or reception of an acoustic signal. The fluid within each sealed compartment may be, for example, air, water, or a fluid similar to a fluid present in the ambient medium 112. Alternatively, the dynamic acoustic impedance matching device 110 may be provided with an agitator independently of transducer 114. As another example, each compartment 142a to 142d may contain an individual agitator to provide selective operation of each particle flow 118a to 118d.

Figure 5:
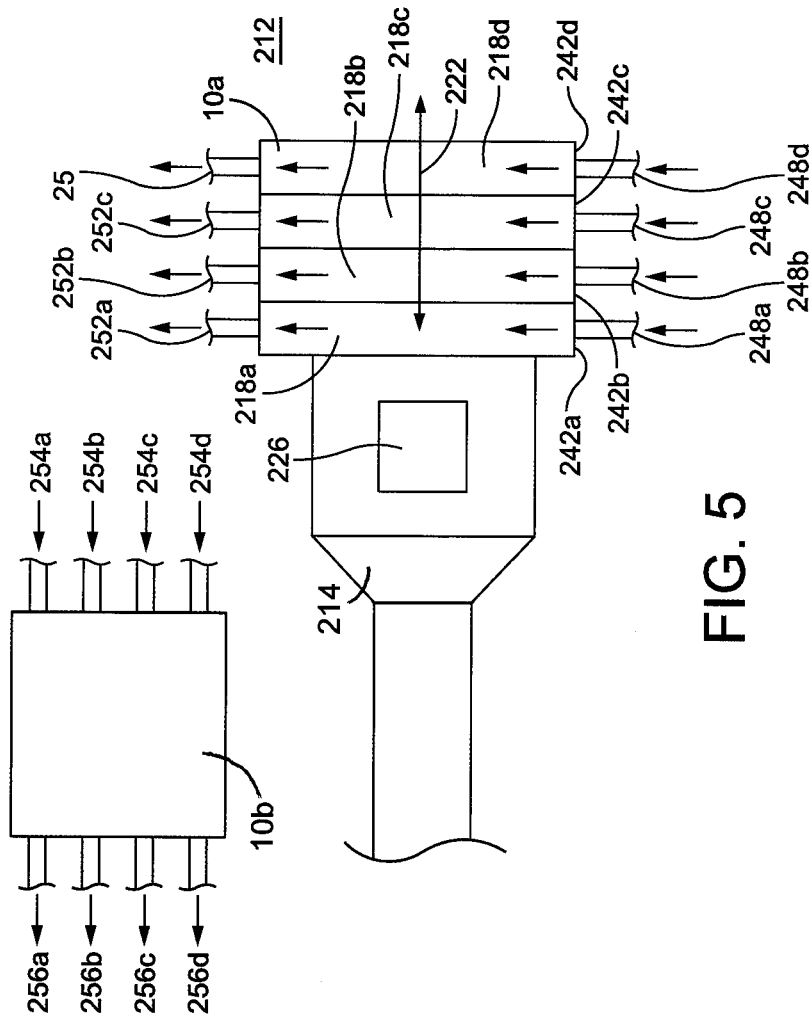
FIG. 5 is a side view of a dynamic acoustic impedance matching device including a pump providing a particle flow in a signal path of a transducer according to another exemplary embodiment.

FIG. 5 shows another exemplary embodiment. The dynamic acoustic impedance matching device 10a includes compartments 242a to 242d, each including a respective inlet 248a to 248d, and a respective outlet 252a to 252d. The dynamic acoustic impedance matching device 10a further includes a pump 10b having a set of inlets 254a to 254d each in fluid communication with respective compartment outlets 252a to 252d. Pump 10b also includes a set of outlets 256a to 256d in fluid communication with respective compartment inlets 248a to 248d.

During operation, each particle flow 218a to 218d may be selectively operated by pump 10b to provide an acoustic impedance to a signal path 222. Specifically, each particle flow 218a to 218d may include a fluid having particles suspended therein which is circulated to and from pump 10b to provide a desired acoustic impedance to transducer 214. For example, air or water may be circulated with suspended sand ($SiO_2$ particles). Pump 10b may be configured to provide operation of individual particle flows 218a to 218d. Further, pump 10b may be configured with a port or ports (not shown) to allow for the addition or removal of fluid or particles to achieve a desired impedance to a signal path 222 of transducer 214.

Figure 7:
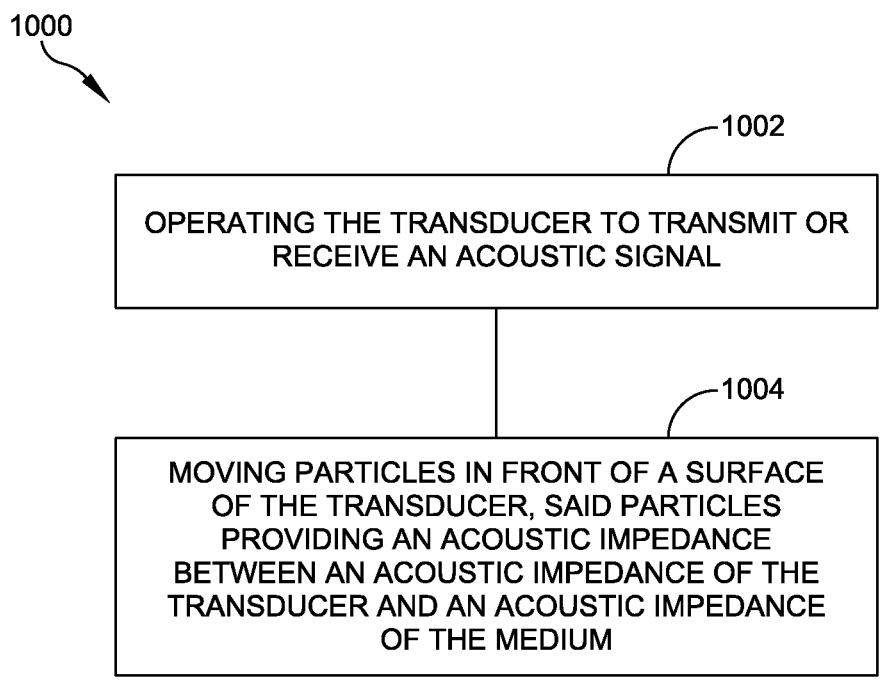
FIG. 7 shows a method according to another exemplary embodiment.

Thus, according to an exemplary embodiment as shown in the flowchart of FIG. 7, a method (1000) of providing an intermediary impedance between a transducer and a medium can include the steps of operating (1002) the transducer to transmit or receive an acoustic signal and moving (1004) particles in an acoustic signal path of the transducer, the particles providing an acoustic impedance between an acoustic impedance of the transducer and an acoustic impedance of the medium.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A transducer for transmitting or
receiving an acoustic signal in a medium, the transducer comprising:
   an piezoelectric acoustic transducer element; and
   a dynamic acoustic impedance matching device adjacent said transducer element, the dynamic acoustic impedance matching device providing an acoustic impedance between an acoustic impedance of said transducer element and an acoustic impedance of the medium;
   wherein said dynamic impedance device provides at least one particle flow adjacent to a surface of said transducer element;
   wherein said at least one particle flow includes a plurality of discrete particle flows layered flowing in parallel and adjacent to said surface of the transducer in a direction transverse to a signal path of an acoustic signal; and
   wherein each said particle flow is released above the transducer to fall by gravitational force in front of the surface of the transducer.

2. The transducer of claim 1, wherein at least one of the plurality of discrete particle flows provides less acoustic impedance than an adjacent particle flow.

3. The transducer of claim 1, further comprising a plurality of compartments sealed from the medium wherein each said particle flow is contained within a respective one of the compartments.

4. The transducer of claim 3, further comprising a pump wherein each said particle flow is circulated by the pump.

* * * * *